(12) United States Patent
Michibata et al.

(10) Patent No.: US 10,686,186 B2
(45) Date of Patent: Jun. 16, 2020

(54) SOLID-STATE BATTERY POSITIVE ELECTRODE MATERIAL, PRODUCTION METHOD FOR SOLID-STATE BATTERY POSITIVE ELECTRODE MATERIAL, ALL-SOLID-STATE LITHIUM-SULFUR BATTERY USING SOLID-STATE BATTERY POSITIVE ELECTRODE MATERIAL, AND PRODUCTION METHOD FOR ALL-SOLID-STATE LITHIUM-SULFUR BATTERY USING SOLID-STATE BATTERY POSITIVE ELECTRODE MATERIAL

(71) Applicants: TOKYO ELECTRIC POWER COMPANY HOLDINGS, INCORPORATED, Chiyoda-ku, Tokyo (JP); TOKYO METROPOLITAN UNIVERSITY, Shinjuku-ku, Tokyo (JP)

(72) Inventors: Hideo Michibata, Tokyo (JP); Kiyoshi Kanamura, Tokyo (JP); Mao Shoji, Tokyo (JP)

(73) Assignees: TOKYO ELECTRIC POWER COMPANY HOLDINGS, INCORPORATED, Chiyoda-Ku, Tokyo (JP); TOKYO METROPOLITAN UNIVERSITY, Shinjuku-Ku, Tokyo (JP)

( * ) Notice: Subject to any disclaimer, the term of this patent is extended or adjusted under 35 U.S.C. 154(b) by 0 days.

(21) Appl. No.: 16/082,413

(22) PCT Filed: Mar. 9, 2017

(86) PCT No.: PCT/JP2017/009359
§ 371 (c)(1),
(2) Date: Dec. 5, 2018

(87) PCT Pub. No.: WO2017/155012
PCT Pub. Date: Sep. 14, 2017

(65) Prior Publication Data
US 2019/0288277 A1 Sep. 19, 2019

(30) Foreign Application Priority Data

Mar. 11, 2016 (JP) .................................. 2016-048272
Feb. 27, 2017 (JP) .................................. 2017-034653

(51) Int. Cl.
*H01M 4/36* (2006.01)
*H01M 4/04* (2006.01)
(Continued)

(52) U.S. Cl.
CPC ............ *H01M 4/362* (2013.01); *H01G 11/56* (2013.01); *H01M 4/0407* (2013.01);
(Continued)

(58) Field of Classification Search
CPC .... H01M 4/0407; H01M 4/136; H01M 4/139; H01M 4/362; H01M 4/38; H01M 4/623;
(Continued)

(56) References Cited

U.S. PATENT DOCUMENTS

2002/0192557 A1* 12/2002 Choi .................... H01M 4/0416
429/232
2013/0149585 A1 6/2013 Wei et al.
(Continued)

FOREIGN PATENT DOCUMENTS

JP 2004-022294 A 1/2004
JP 2007-520032 A 7/2007
(Continued)

OTHER PUBLICATIONS

Machine translation of JP2013-191547 (no date).*
(Continued)

*Primary Examiner* — Amanda C. Walke
(74) *Attorney, Agent, or Firm* — Osha Liang LLP (57) ABSTRACT

(Problem to be Solved)
The present application is to provide: a positive electrode material for producing a lithium-sulfur solid-state battery that does not experience degradation of battery performance
(Continued)

from charging/discharging cycling, does not present the fire risk of liquid electrolytes, and thereby makes battery performance compatible with safety; an all-solid-state lithium-sulfur battery that uses the positive electrode material; and a production method.

(Means for Solution)

The present application relate to a lithium-sulfur solid-state battery positive electrode material that contains: sulfur; a conductive material; a binder; and an ionic liquid or a solvate ionic liquid, and an all-solid-state lithium-sulfur battery that includes: a positive electrode that comprises the positive electrode material; a negative electrode; and an oxide solid electrolyte. The positive electrode material is manufactured by means of a method wherein a slurry obtained by adding an organic solvent to the sulfur, the conductive material, the binder, and the ionic liquid or solvate ionic liquid is applied to one surface of an oxide solid electrolyte formation body and dried to remove the organic solvent.

6 Claims, 2 Drawing Sheets

(51) Int. Cl.
| | | |
|---|---|---|
| *H01M 4/139* | (2010.01) | |
| *H01M 4/38* | (2006.01) | |
| *H01M 4/62* | (2006.01) | |
| *H01M 10/052* | (2010.01) | |
| *H01M 10/0562* | (2010.01) | |
| *H01G 11/56* | (2013.01) | |
| *H01M 4/02* | (2006.01) | |

(52) U.S. Cl.
CPC .............. *H01M 4/139* (2013.01); *H01M 4/38* (2013.01); *H01M 4/623* (2013.01); *H01M 10/052* (2013.01); *H01M 10/0562* (2013.01); *H01M 2004/028* (2013.01); *H01M 2300/0071* (2013.01)

(58) Field of Classification Search
CPC ........... H01M 10/052; H01M 10/0562; H01M 2004/028; H01M 2300/0071; H01G 11/56
USPC ........................................................ 429/322
See application file for complete search history.

(56) References Cited

U.S. PATENT DOCUMENTS

| | | | |
|---|---|---|---|
| 2016/0056490 A1* | 2/2016 | Chiang | H01M 8/188 |
| | | | 429/104 |
| 2016/0218352 A1* | 7/2016 | Musameh | H01M 4/136 |
| 2017/0084949 A1* | 3/2017 | Yokoyama | H01M 10/052 |
| 2017/0294678 A1* | 10/2017 | Lee | B05D 1/30 |
| 2018/0287206 A1* | 10/2018 | Makino | H01M 4/1393 |
| 2018/0316043 A1* | 11/2018 | Jung | H01M 4/38 |
| 2019/0067730 A1* | 2/2019 | Archer | H01M 4/624 |
| 2019/0198919 A1* | 6/2019 | Makino | H01M 4/62 |
| 2019/0273282 A1* | 9/2019 | Michibata | H01M 4/382 |

FOREIGN PATENT DOCUMENTS

| | | |
|---|---|---|
| JP | 2007-294429 A | 11/2007 |
| JP | 2008-53135 A | 3/2008 |
| JP | 2008-130229 A | 6/2008 |
| JP | 2008-218385 A | 9/2008 |
| JP | 2009-231829 A | 10/2009 |
| JP | 2011-51855 A | 3/2011 |
| JP | 2013191547 A | 9/2013 |
| JP | 2015-11823 A | 1/2015 |
| JP | 2015-146299 A | 8/2015 |
| WO | 2008/056585 A1 | 5/2008 |
| WO | WO-2014176644 A2 * | 11/2014 |

OTHER PUBLICATIONS

Machine translation of JP2008053135(no date).*
Machine translation of JP2008130229 (no date).*
Suriyakumar et al, "Charge-Discharge and Interfcial Properties of Ionic Liquid-Added Hybrid Electrolytes for Lithium-Sulfur Batteries ", ACS Omega, 4, 3894-93903 (2019). (Year: 2019).*
Zheng et al, "Research Progress Towards Understanding the Unique Interfaces Between Concentrated Electrolytes and Electrodes for Energy Storage Applications", Advanced Science, 4, 1700032 (2017). (Year: 2017).*
International Search Report issued in PCT/JP2017/009359, dated Apr. 4, 2017 (6 pages).
Written Opinion of the International Searching Authority issued in PCT/JP2017/009359, dated Apr. 4, 2017 (22 pages).
Naoki Tachikawa et al., "Charge-discharge properties of lithium anode in Li[N(CF3SO2)2]-glyme solvate ionic liquid electrolytes", Abstracts, Battery Symposium in Japan Dai 55 Kai, Yoshiharu Uchimoto (Kosha) The Committer of Battery Technology, The Electrochemical Society of Japan, 2014, p. 373, particularly, column of Introduction (6 pages).
Office Action issued in corresponding Japanese Application No. 2017-034653, dated Mar. 13, 2018 (7 pages).
Office Action (Decision to Grant a Patent) issued in corresponding Japanese Application No. 2017-168435, dated Jul. 31, 2018 (6 pages).

* cited by examiner

SOLID-STATE BATTERY POSITIVE ELECTRODE MATERIAL, PRODUCTION METHOD FOR SOLID-STATE BATTERY POSITIVE ELECTRODE MATERIAL, ALL-SOLID-STATE LITHIUM-SULFUR BATTERY USING SOLID-STATE BATTERY POSITIVE ELECTRODE MATERIAL, AND PRODUCTION METHOD FOR ALL-SOLID-STATE LITHIUM-SULFUR BATTERY USING SOLID-STATE BATTERY POSITIVE ELECTRODE MATERIAL

TECHNICAL FIELD

The present invention relates to a solid-state battery positive electrode material and a production method for the solid-state battery positive electrode material, as well as an all-solid-state lithium-sulfur battery using the solid-state battery positive electrode material, and a production method for the all-solid-state lithium-sulfur battery.

BACKGROUND ART

In recent years, electronic apparatuses such as AV apparatus and personal computer, communication apparatuses, and the like, have been rapidly becoming more portable and cordless. For power sources of such electronic apparatuses and communication apparatuses, secondary batteries having high energy density and excellent load characteristics have been demanded. Use of lithium secondary batteries having high voltage, high energy density, and excellent cycle characteristics has been expanding.

However, a conventional lithium secondary battery generally uses an electrolytic solution as an electrolyte. Since organic solvents constituting these electrolytic solutions are flammable and have risk of ignition, they have problem about safety.

Since a so-called solid battery using a solid electrolyte as an electrolyte does not use a flammable electrolytic solution, it has high safety and can achieve theoretically high energy density, and therefore it has been studied by many universities, manufactures, etc.

However, in the solid battery, since not only an electrode but also an electrolyte is solid, contact portions on the interface between particles forming the electrode and particles forming the electrolyte become smaller, thus making movement of lithium ions or electrons difficult as compared with the case where an electrolytic solution is used as electrolyte. Then, the interface resistance is increased, and, as a result, battery characteristics such as energy density tends to become lower.

As a method for suppressing the interface resistance between a solid electrolyte and an electrode, a method of sandwiching an interface layer made of a mixture of electrolyte particles and electrode particles between the electrolyte and the electrode, or a method of coating surfaces of the electrolyte particles and the electrode particles with a conductive coating film, and the like, have been proposed. However, substantial reduction of the interface resistance cannot be achieved.

Meanwhile, since sulfur has a very high theoretical capacity density as 1675 mAh/g, and can be expected as a battery material having high energy density, lithium-sulfur batteries using sulfur as a positive electrode active material, and lithium metal as a negative electrode have been considered.

However, also in the case of the lithium-sulfur battery, when a solid electrolyte is used as an electrolyte, as mentioned above, the energy density of a battery is not as high as expected due to interface resistance generated in the interface between the electrolyte and an electrode.

Furthermore, in a case where an electrolyte containing an organic solvent is used, in addition to risk of fire, there is a problem that a sulfur molecule or a reaction intermediate (for example, lithium polysulfide) generated by the reaction between a lithium ion with sulfur is dissolved and diffuses into an electrolytic solution during charging and discharging, thus causing occurrence of self-discharge or degradation of a negative electrode. Use of an ionic liquid as an electrolyte can avoid the risk of fire, but it cannot prevent the sulfur molecule and the polysulfide ion from being dissolved, and may cause deterioration of the battery performance.

As a production method for a battery electrode, PTL 1 proposes a method of forming an active material layer by attaching a paste to a current collector, in which the paste is obtained by heating and reducing pressure treatment with a mixture of electrode active material and an ambient temperature molten salt. The ambient temperature molten salt is a combination of cation components including imidazolium cations such as ethylmethylimidazolium tetrafluoroborate, ammonium cations such as diethylmethylpropylammonium trifluoromethanesulfonylimide, and pyridinium cations such as ethylpyridinium tetrafluoroborate, and anion components including tetrafluoroborate anion ($BF_4^-$), hexafluorophosphate anion ($PF_6^-$), trifluorosulfonyl anion (($CF_3SO_2)_2N^-$), and bis(trifluorosulfonyl)imide anion (($C_2F_5SO_2)_2N^-$). To a liquid electrolyte in which supporting salt (lithium salt) is added to the ambient temperature molten salt, powder of lithium cobalt oxide, lithium nickel oxide, lithium nickel cobalt oxide, and lithium manganese oxide are mixed as the positive electrode active material.

However, in the lithium-ion secondary battery described in PTL 1, a positive electrode active material layer and a negative electrode active material layer are stacked so as to face each other with a separator sandwiched therebetween, and the stack is impregnated with the ambient temperature molten salt electrolyte to produce a coin-type lithium-ion secondary battery. Therefore, the lithium-ion secondary battery is not an all-solid-state lithium secondary battery using a solid electrolyte as an electrolyte.

PRIOR ART

Patent Literature

PTL 1: Japanese Patent Unexamined Publication No. 2004-022294

SUMMARY OF THE INVENTION

Problems to be Solved by the Invention

An object of the present invention is to solve the problems arising from solid electrolytes by reducing the interface resistance between a solid electrolyte and an electrode, and to provide a positive electrode material for obtaining a lithium-sulfur solid-state battery that achieves both safety and battery performance, an all-solid-state lithium-sulfur battery using the positive electrode material, as well as a production method for the positive electrode material and the all-solid-state lithium-sulfur battery.

Means for Solving the Problems

In order to solve the above-mentioned problems, the inventors of the present invention have made intensive studies. As a result, the inventors have obtained new findings that when a solid-state lithium-sulfur battery positive electrode material is allowed to contain an ionic liquid or a solvated ionic liquid, it is possible to reduce the interface resistance between the solid electrolyte and the electrode, resulting in improving charge-discharge capacity of the lithium-sulfur solid-state battery.

Furthermore, the inventors have obtained new findings that a positive electrode slurry containing sulfur, a carbon material, a binder (a binding agent), and an ionic liquid or a solvated ionic liquid is applied to a predetermined position of the solid electrolyte molded body, and dried to remove a solvent to form a positive electrode material, and thereby the solid electrolyte and the positive electrode material can be brought into close contact with each other.

In other words, the present invention is as follows.

(1) A solid-state lithium-sulfur battery positive electrode material containing sulfur, a conductive material, a binder, and an ionic liquid or a solvated ionic liquid.

(2) The solid-state lithium-sulfur battery positive electrode material described in the above (1), wherein the ionic liquid contains a lithium salt.

(3) The solid-state lithium-sulfur battery positive electrode material described in the above (1), wherein the solvated ionic liquid includes a lithium salt and glyme.

(4) The solid-state lithium-sulfur battery positive electrode material described in the above (3), wherein the lithium salt is at least one selected from lithium-bis(fluorosulfonyl)imide and lithium-bis(trifluoromethane sulfonyl) imide, and the glyme is at least one selected from triglyme and tetraglyme.

(5) The solid-state lithium-sulfur battery positive electrode material described in any one of the above (1) to (4), wherein the conductive material is conductive carbon black.

(6) The solid-state lithium-sulfur battery positive electrode material described in any one of the above (1) to (5), wherein the binder is polyvinylidene fluoride.

(7) The solid-state lithium-sulfur battery positive electrode material described in any one of the above (1) to (6), wherein a percentage of each component in the positive electrode material is 45 to 60% by mass, 20 to 35% by mass, 0.1 to 10% by mass, and 10 to 20% by mass for the sulfur, the conductive material, the binder, and the ionic liquid or the solvated ionic liquid, respectively.

(8) A production method for a solid-state lithium-sulfur battery positive electrode material that contains sulfur, a conductive material, a binder, and an ionic liquid or a solvated ionic liquid, the method including:

a step of attaching a masking tape to one surface of an oxide-based solid electrolyte molded body leaving a positive electrode forming portion;

a step of applying positive electrode slurry containing the sulfur, the conductive material, the binder, and the ionic liquid or the solvated ionic liquid to a positive electrode forming portion of the oxide-based solid electrolyte molded body, and uniformly spreading the slurry; and a step of forming a positive electrode on the oxide-based solid electrolyte molded body by solidifying the positive electrode slurry by vacuum drying, and then removing the masking tape.

(9) The production method for a solid-state lithium-sulfur battery positive electrode material described in the above (8), wherein the positive electrode slurry is obtained by mixing and pulverizing the sulfur and the conductive material, and then, adding a solution of the binder and the ionic liquid or the solvated ionic liquid, and further adding a solvent.

(10) The production method for a solid-state lithium-sulfur battery positive electrode material described in the above (8) or (9), wherein a nonvolatile portion excluding the solvent of the positive electrode slurry includes 45 to 60% by mass of sulfur, 20 to 35% by mass of conductive material, 0.1 to 10% by mass of binder, and 10 to 20% by mass of ionic liquid or solvated ionic liquid.

(11) The production method for a solid-state lithium-sulfur battery positive electrode material described in any one of the above (8) to (10), wherein the ionic liquid contains a lithium salt.

(12) The production method for a solid-state lithium-sulfur battery positive electrode material described in any one of the above (8) to (10), wherein the solvated ionic liquid includes at least one selected from lithium-bis(fluorosulfonyl)imide and lithium-bis(trifluoromethane sulfonyl) imide, and at least one selected from triglyme and tetraglyme.

(13) The production method for a solid-state lithium-sulfur battery positive electrode material described in any one of the above (8) to (12), wherein the conductive material is conductive carbon black.

(14) The production method for a solid-state lithium-sulfur battery positive electrode material described in any one of the above (8) to (13), wherein the binder is polyvinylidene fluoride.

(15) The production method for a solid-state lithium-sulfur battery positive electrode material described in any one of the above (8) to (14), wherein the oxide-based solid electrolyte is lithium-lanthanum-zirconium composite oxide.

(16) An all-solid-state lithium-sulfur battery including a positive electrode including the positive electrode material described in any one of the above (1) to (7), a negative electrode containing lithium metal, and a layer of an oxide-based solid electrolyte interposed between the positive electrode and the negative electrode.

(17) The all-solid-state lithium-sulfur battery described in the above (16), wherein the oxide-based solid electrolyte is lithium-lanthanum-zirconium composite oxide.

(18) The all-solid-state lithium-sulfur battery described in the above (17), wherein the lithium-lanthanum-zirconium composite oxide is composite oxide further containing one or more elements selected from aluminum, tantalum, niobium, and bismuth.

(19) The all-solid-state lithium-sulfur battery described in any one of the above (16) to (18), wherein an operating temperature is 110° C. or less.

(20) The all-solid-state lithium-sulfur battery including a positive electrode including a solid-state lithium-sulfur battery positive electrode material produced by the method described in any one of the above (8) to (15), a negative electrode containing lithium metal, and a layer of an oxide-based solid electrolyte interposed between the positive electrode and the negative electrode.

(21) A motor vehicle equipped the all-solid-state lithium-sulfur battery according to any one of the above (16) to (20).

(22) An electric power storage system configured to supply electric power from the all-solid-state lithium-sulfur battery described in any one of the above (16) to (20) to an electric power network, or to supply electric power from the electric power network to the all-solid-state lithium-sulfur battery.

(23) A production method for a lithium-sulfur solid-state battery, the method including:

a step of bonding a negative electrode metal to one surface of an oxide-based solid electrolyte molded body, and heat treating;

a step of attaching a masking tape to a surface opposite side to a surface forming a negative electrode of the oxide-based solid electrolyte molded body leaving a positive electrode forming portion;

a step of applying positive electrode slurry containing sulfur, a conductive material, a binder, and an ionic liquid or a solvated ionic liquid on a positive electrode forming portion of the oxide-based solid electrolyte molded body and uniformly spreading the slurry; and a step of solidifying the positive electrode slurry by vacuum drying, then removing the masking tape, thus forming a positive electrode on an oxide-based solid electrolyte molded body.

Effects of the Invention

A solid-state lithium-sulfur battery positive electrode material of the present invention contains ionic liquid or solvated ionic liquid that is a liquid state, but that is non-volatile and nonflammable. Furthermore, according to a production method for a solid-state lithium-sulfur battery positive electrode material of the present invention, since a positive electrode material is formed in a state in which it is brought into close contact with a surface of a solid electrolyte, a liquid-state ionic liquid or a solvated ionic liquid is interposed in an interface between the solid electrolyte and the positive electrode. Thus, as a result, a contact area between the solid electrolyte and the positive electrode can be increased. Since the ionic liquid or the solvated ionic liquid has a lithium ion conductivity, the interface resistance between the solid electrolyte and the positive electrode is reduced. Thus, a lithium-sulfur solid-state battery having less performance deterioration even after repeated charging/discharging cycle.

Furthermore, since an electrolyte layer is a solid electrolyte, it is possible to provide an all-solid-state lithium-sulfur battery in which deterioration of battery performance due to dissolution and diffusion of sulfur and polysulfide into an electrolytic solution can be prevented, and which is safe and has little risk of fire because an operating temperature is 110° C. or less.

EMBODIMENTS FOR CARRYING OUT THE INVENTION

It is essential that a solid-state lithium-sulfur battery positive electrode material of the present invention contains an ionic liquid or a solvated ionic liquid, and basically includes sulfur, a conductive material, a binder such as polyvinylidene fluoride, and an ionic liquid or a solvated ionic liquid.

The ionic liquid or the solvated ionic liquid used in the present invention is a liquid that presents liquid state when at about 150° C. or less, and has non-volatile property, nonflammable property, and ionic conductivity.

Examples of the ionic liquid include 1-ethyl-3-methyl-imidazolium-bis(trifluorosulfonyl)imide, 1-ethyl-3-methyl-imidazoliumtetrafluoroborate, trimethylpropyl ammonium-bis(trifluoromethylsulfonyl)imide, ethylpyridinium tetrafluoroborate, and the like. The ionic liquid may be used singly or in combination two or more thereof.

In the ionic liquid, as the supporting salt, a mixture of well-known lithium salts such as lithium tetrafluoroborate ($LiBF_4$), lithium perchlorate ($LiClO_4$), lithium trifluoromethyl sulfonate ($Li(CF_3SO_3)$), lithium-bis(trifluoromethane sulfonyl)imide ($LiN(CF_3SO_2)_2$), lithium-bis(pentafluoroethane sulfonyl)imide ($LiN(C_2F_5SO_2)_2$), lithium hexafluorophosphate ($LiPF_6$), and the like, can be used. The supporting salt may be used singly or in combination two or more thereof.

A mixing ratio (molar ratio) of the ionic liquid and supporting salt is preferably 1:0.1 to 2, more preferably 1:0.8 to 1.2, and particularly preferably 1:1.

As the solvated ionic liquid, a mixture of a lithium salt and glyme is used. Depending on the combination of lithium salt and glyme, mixtures having different thermally decomposition temperatures are produced. A solvated ionic liquid that does not thermally decompose at about 100° C. is preferably used.

Examples of the lithium salt include lithium-bis(fluorosulfonyl)imide ($LiN(SO_2F_2)_2$), lithium-bis(trifluoromethane sulfonyl)imide ($LiN(CF_3SO_2)_2$), lithium-bis(pentafluoroethane sulfonyl)imide ($LiN(C_2F_5SO_2)_2$), and the like. The lithium salt may be used singly or in combination two or more thereof.

The glyme may have the same alkyl group or different alkyl groups at both ends. Examples of the glyme include triglymes such as triethylene glycol dimethyl ether, triethylene glycol diethyl ether, and trimethylene glycol methyl ethyl ether, and tetraglyms such as tetraethylene glycol dimethyl ether, tetraethylene glycol diethyl ether, and tetraethylene glycol methyl ethyl ether. Furthermore, the alkyl group may be substituted with fluorine. Among these lithium salts, lithium-bis(fluorosulfonyl)imide, and lithium-bis(trifluoromethane sulfonyl)imide are preferable. The glyme may be used singly or in combination two or more thereof.

In the above-mentioned ionic liquid or a solvated ionic liquid, a solvated ionic liquid is preferable, and a mixture of lithium-bis(fluorosulfonyl)imide (hereinafter, referred to as "LiFSI") and triethylene glycol dimethyl ether or tetraethylene glycol dimethyl ether is particularly preferable because excellent lithium ion conductivity is achieved, and sulfur or polysulfide does not easily elute.

A mixing ratio (molar ratio) of a lithium salt and glyme preferably satisfies lithium salt:glyme=40:60 to 60:40, more preferably 45:55 to 55:45, and particularly preferably 50:50.

The positive electrode material of the present invention uses sulfur as an active material. However, since there is a problem that sulfur itself is poor in electrical conduction property, it is necessary to use a conductive material together. Examples of the conductive material include carbon blacks such as acetylene black, Ketjen black, channel black, and furnace black, graphites including natural graphite such as flake graphite and artificial graphite, conductive fibers such as carbon fiber and metal fiber, metal powder of copper, silver, etc., organic conductive materials such as a polyphenylene compound, a carbon nanotube, and the like.

Among the conductive materials, carbon blacks are preferable because they have a structure of many pores and exhibit an effect as a binder by incorporating sulfur, an ionic liquid or a solvated ionic liquid, into the pores, and have high electric conductivity. In particular, conductive carbon blacks having a hollow shell structure, for example Ketjen black etc., are preferable.

The conductive carbon blacks have a Brunauer-Emmett-Teller (BET) specific surface area by a nitrogen gas adsorption method of preferably 500 $m^2/g$ or more, more preferably 750 $m^2/g$ or more, and further preferably 1000 $m^2/g$ or more.

Furthermore, it is preferable that the positive electrode material of the present invention uses a binder together. Examples of the binder include polyvinylidene fluoride (PVDF), vinylidene fluoride-hexafluoropropylene copolymer, vinylidene fluoride-chlorotrifluoroethylene copolymer, vinylidene fluoride-pentafluoropropylene copolymer, vinylidene fluoride-perfluoromethyl vinyl ether-tetrafluoroethylene copolymer, vinylidene fluoride-hexafluoropropylene-tetrafluoroethylene copolymer, ethylene-tetrafluoroethylene copolymer (ETFE), propylene-tetrafluoroethylene copolymer, polyvinylpyrrolidone, polyethylene oxide, polyvinyl alcohol, polyacrylonitrile, polymethyl methacrylate, polyethylene, polypropylene, polytetrafluoroethylene (PTFE), and the like, and polyvinylidene fluoride is preferably used. These binders may be used singly or in combination two or more thereof.

An adding method of these binders is not particularly limited. For example, a binder can be used as powder, or as a solution of a binder in an organic solvent, or as an emulsion in water as a solvent. Preferable examples of the organic solvent is N-methyl-2-pyrrolidone.

The content of sulfur in the positive electrode material of the present invention including the sulfur, the conductive material, the binder, and the ionic liquid or the solvated ionic liquid is preferably 45 to 60% by mass, and more preferably 50 to 55% by mass. When sulfur is 45% by mass or more, a battery can have high theoretical energy density. On the other hand, when sulfur is 60% by mass or less, since the contents of the conductive material and the ionic liquid or the solvated ionic liquid can be secured sufficiently, conductivity necessary to the positive electrode material becomes possible, and the interface resistance between the positive electrode material and the solid electrolyte can be reduced.

The content of the conductive material is preferably 20 to 35% by mass, and more preferably 20 to 30% by mass. When the conductive material is 20% by mass or more, the positive electrode can be provided with sufficient conductivity. On the other hand, when the conductive material is 35% by mass or less, the contents of the sulfur and the ionic liquid or the solvated ionic liquid can be secured sufficiently, and, therefore, the energy density of a battery can be improved, and the interface resistance between the positive electrode material and the solid electrolyte can be reduced.

The content of the binder is preferably 0.1 to 10% by mass, more preferably 5 to 10% by mass, and further preferably 7 to 9% by mass. When the binder is 0.1% by mass or more, retention of the sulfur or the ionic liquid or the solvated ionic liquid in pores of the conductive material such as Ketjen black, or fixation of the conductive material to the solid electrolyte can be enhanced more effectively. On the other hand, when the binder is 10% by mass or less, it is possible to avoid deterioration of conductivity of the positive electrode material because the binder itself is insulator.

The content of the ionic liquid or the solvated ionic liquid is preferably 10 to 20% by mass, and more preferably 12 to 18% by mass. When the content of the ionic liquid or the solvated ionic liquid is 10% by mass or more, the interface resistance between the positive electrode material and the solid electrolyte can be effectively reduced. On the other hand, when the content is 20% by mass or less, uneconomical use can be avoided when an effect of reducing the interface resistance is not still enhanced.

Next, a production method for the positive electrode material of the present invention is described.

The production method for a positive electrode material of the present invention aims to reduce the interface resistance between the positive electrode material and a solid electrolyte by forming the positive electrode material such that it is brought into close contact with the surface of the solid electrolyte as close as possible.

As the solid electrolyte, lithium composite oxide, lithium-containing sulfide, and the like, which are well known in lithium ion batteries can be used. However, the lithium-containing sulfide may react with water and oxygen in the air to generate toxic gas. Therefore, the oxide-based solid electrolyte is preferably used, and lithium composite oxide is more preferably used.

Preferable examples of the lithium composite oxide include lithium-lanthanum-zirconium composite oxide, lithium-lanthanum-titanium composite oxide, lithium-niobium composite oxide, lithium-niobium-zirconium composite oxide, lithium-lanthanum-zirconium-tantalum composite oxide, and the like, and lithium-lanthanum-zirconium composite oxide (hereinafter, referred to as "LLZ") is preferable. A production method for of LLZ can use a well-known method. LLZ is composite oxide including lithium, lanthanum, and zirconium having a basic composition of $Li_7La_3Zr_2O_{12}$, and it may contain one or more elements selected from aluminum, tantalum, niobium, and bismuth, as necessary.

The shape or size of a solid electrolyte forming a positive electrode material are different depending on the shape or size of finally assembled batteries. A positive electrode material of the present invention, an all-solid-state lithium-sulfur battery using the positive electrode material, as well as a production method for the positive electrode material and the all-solid-state lithium-sulfur battery are described in detail taking a case where a coin-type battery is assembled using LLZ as a solid electrolyte is detailed as an example.

As the oxide-based solid electrolyte molded body, for example, an LLZ molded body having a diameter of about 12 mm and a thickness of about 0.5 mm can be used. The LLZ molded body can be produced by a well-known method. For example, a method disclosed in Japanese Patent Unexamined Publication. 2015-146299 can be used.

In other words, a stoichiometric amount of lanthanum compound powder and zirconium compound powder are mixed while pulverizing, molded into a predetermined shape using a press machine, and then fired in an electric furnace at preferably 1300 to 1700° C. to obtain a lanthanum-zirconium oxide molded body. This molded body has porosity of preferably 75% or more, and more preferably 80 to 90%. When the porosity is 75% or more, the molded body is easily impregnated with a lithium compound. On the other hand, when the porosity is 90% or less, strength of the molded body can be maintained. The porosity is a value calculated from the all pore volume ($cm^3/g$) by a mercury press-in method (conforming to JIS R 1655) and apparent density ($cm^3/g$) measured from the Archimedes' method. The porosity can be adjusted by a firing temperature.

The lanthanum compound is not particularly limited. For example, lanthanum hydroxide, lanthanum oxide, lanthanum chloride, lanthanum nitrate, and the like, can be used. Lanthanum hydroxide, which generates less toxic gas at the time of firing, is preferable.

The zirconium compound is not particularly limited. For example, zirconium oxide, zirconium chloride, zirconium nitrate, zirconium acetate, and the like, can be used. Zirconium oxide, which generates less toxic gas at the time of firing, is preferable.

Subsequently, an aqueous solution dissolving a stoichiometric amount of lithium compound is added to the lanthanum-zirconium oxide molded body, and the inside of pores of the molded body is impregnated with a lithium compound, followed by firing in a microwave firing furnace or the like at preferably 200 to 500° C., and more preferably 300 to 450° C. It is advantageous that use of microwave as a heat source makes it possible to obtain a dense sintered body of LLZ. When hot air or infrared rays are used as a heat source, since a lithium compound is reacted in a heated portion, the reaction proceeds only on a surface of the molded body, thus making it difficult to obtain a dense molded body having an $Li_7La_3Zr_2O_{12}$ structure. Irradiation with microwave having frequency of 1 to 300 GHz, and usually 2.45 GHz is carried out. A preferable method is a method of adjusting output of the microwave in a range from 1.5 to 9.5 kW, and controlling the microwave irradiation by, for example, PID control to maintain a temperature after it reaches a predetermined firing temperature.

The lithium compound used for impregnation of a molded body is used such that the molar ratio of lithium, lanthanum, and zirconium is 7:3:2 based on the basic composition of LLZ.

The lithium compound is not particularly limited. For example, lithium hydroxide, lithium oxide, lithium chloride, lithium nitrate, lithium sulfate, lithium acetate, and the like, can be used. Among them, lithium hydroxide (LiOH) is preferable because it has high solubility in water and generates less toxic gas at the time of firing, or lithium oxide ($Li_2O$) dissolved in water to become lithium hydroxide is preferable.

A method for impregnating a lanthanum-zirconium oxide molded body with lithium is not particularly limited as long as a method is capable of impregnating the molded body with a stoichiometric amount of lithium. Examples thereof include the following methods.

(1) A lanthanum-zirconium oxide molded body is impregnated with a part of a solution in which a necessary amount of lithium compound is dissolved in a solvent, and then, the molded body is dried to remove a solvent. The above-mentioned molded body is impregnated with a part of the above-mentioned solution again, and then, the molded body is dried to remove a solvent. Then, impregnation and drying are repeated until the prepared solution disappears.

(2) A lanthanum-zirconium oxide molded body is impregnated with slurry in which a necessary amount of lithium hydroxide and the like is dispersed in a small amount of water. In this case, as lithium hydroxide, it is preferable to use fine particulate lithium hydroxide that easily enters pores (air gaps) of the molded body.

(3) Li salt (for example, LiCl) having high solubility is dissolved in water to prepare high-concentration LiCl aqueous solution, and the lanthanum-zirconium oxide molded body is impregnated with the aqueous solution.

(4) Powdery LiOH is added into a lanthanum-zirconium oxide molded body, and the lanthanum-zirconium oxide molded body is impregnated with LiOH by thermal melting. In this case, the melting temperature is preferably the melting point of LiOH (462° C.) or higher.

The shape and size of the lanthanum-zirconium oxide molded body and LLZ are not particularly limited. Depending on structures of batteries, for example, the shape may be a plate shape, a sheet shape, a cylindrical shape, or the like.

In the present invention, it is preferable that before a positive electrode material is formed on a surface of an oxide-based solid electrolyte molded body, a gold thin film is formed by sputtering in advance on a negative electrode side surface of the molded body, that is, a surface opposite to a surface having the positive electrode material. Then, when a battery cell is assembled, a metal film is bonded to metallic lithium serving as a negative electrode to each other, heated preferably at 60 to 170° C., and more preferably at 100 to 140° C. Thus, the metallic lithium and gold are alloyed, and the interface resistance between the negative electrode and the solid electrolyte can be reduced.

Practically, it is preferable to attach metallic lithium such as a lithium foil to the negative electrode side surface of the oxide-based solid electrolyte molded body without sputtering gold, then heat the metallic lithium, and press the metallic lithium as necessary. This can improve the contact property (close-contact property) between the negative electrode and the solid electrolyte, and reduce the interface resistance.

In the above, it is preferable that the positive electrode is formed on the oxide-based solid electrolyte body, and then a lithium foil is attached to the surface opposite to the positive electrode of the oxide-based solid electrolyte molded body, followed by heat treatment. Alternatively, a lithium foil is attached to the oxide-based solid electrolyte and heat treatment is carried out, and then a positive electrode can be also formed on a surface opposite to a surface of the oxide solid electrolyte on which a lithium foil has been attached. A heat-treatment temperature is not particularly limited as long as it softens a lithium foil. The temperature is preferably 60 to 170° C., and more preferably 100 to 140° C.

Gold is sputtered on the negative electrode side of the solid electrolyte, and then, a polyimide tape from which a positive electrode forming portion is cut out is attached as a masking tape to the opposite surface. Note here that the masking tape is not limited to polyimide, and may be any polymer that is insoluble in a slurry solvent and does not melt during vacuum drying mentioned below.

The shape or size of the positive electrode forming portion of the masking tape is preferably a shape or size such that an LLZ surface having a width of at least about 2 mm remains around the positive electrode. So that the formed positive electrode protrudes to the periphery of the solid electrolyte so as not to cause a short circuit. For example, in a case of an LLZ molded body having a diameter of about 12 mm, a polyimide tape having a circular positive electrode forming portion having a diameter of about 8 mm is preferably used as a masking tape.

Subsequently, an appropriate amount of positive electrode slurry is mounted on the positive electrode forming portion of the polyimide tape, the slurry is cut by rubbing using a spatula, a glass plate, and the like, and spread flat. Then, a solvent in the positive electrode slurry is removed by vacuum drying. After the solvent is removed, the polyimide tape is peeled off and removed. Thus, a positive electrode material in a state of close contact with the LLZ molded body can be obtained.

Since a thickness of the applied positive electrode slurry becomes the same as the thickness of the polyimide tape, weight or thickness of the positive electrode material can be adjusted by changing a thickness of the polyimide tape to be used.

Conditions of vacuum drying are not particularly limited, but rapid evaporation of a solvent in the positive electrode slurry may inhibit tight adhesion of the positive electrode material to the surface of the LLZ molded body. The vacuum drying is preferably at a temperature of about 70 to 90° C. for about 10 to 15 hours.

A preparation method of the positive electrode slurry can be carried out by a well-known method. A predetermined amount of sulfur and a predetermined amount of conductive materials such as conductive carbon black are mixed with each other while pulverizing, and then, binder powder or solution such as a predetermined amount of polyvinylidene fluoride, as well as a predetermined amount of ionic liquid or solvated ionic liquid are added thereto, and the mixture is stirred while a solvent is gradually added, so that slurry can be obtained.

As the solvent, a well-known solvent for a lithium ion battery can be used. Examples of the solvent include amide-based solvents such as N-methyl-2-pyrrolidone and dimethyl acetamide, amine-based solvents such as N,N-dimethylaminopropyl amine and diethylene triamine, ketone-based solvents such as methyl ethyl ketone, ester solvents such as acetic acid ester, ether-based solvents such as tetrahydrofuran, and hydrocarbon-based solvents such as toluene, xylene, n-hexane, and cyclohexane.

Use amounts of these solvents are not particularly limited. The use amounts may be amounts that has fluidity such that the positive electrode slurry can be transferred to the positive electrode forming portion of the LLZ molded body by using a glass rod, and the like, and exhibits viscosity such that the positive electrode slurry stays without flowing after the slurry is transferred to the positive electrode forming portion.

By using, for example, a commercially available a coin-type battery cell case, a lithium foil serving as a negative electrode is placed on the lower cap of the cell case, and the LLZ molded body is mounted such that the lithium foil faces an opposite side of positive electrode forming portion. Subsequently, a metal foil such as a stainless steel foil or an aluminum foil serving as the positive electrode current collector is mounted on the positive electrode of the LLZ molded body. Thus, the battery cell is assembled, and the upper cap of the cell case is covered so as to complete a battery.

In the all-solid-state lithium-sulfur battery of the present invention, a layer of an oxide-based solid electrolyte mentioned above is interposed between the positive electrode and the negative electrode mentioned above.

The negative electrode is not particularly limited as long as it contains a material that occludes and releases a lithium ion, as a negative electrode active material. Examples thereof include lithium metal such as a lithium foil, a lithium alloy that is an alloy of lithium with aluminum, silicon, tin, magnesium, and the like, and in addition to them, metallic oxide, metallic sulfide, a carbon material, and the like, capable of occluding and releasing a lithium ion. Among them, lithium metal is preferable because theoretical capacity density is high, handling is easy, and a battery cell is easily assembled.

As the current collector, for example, metal such as copper, aluminum, nickel, and stainless steel, and the like, can be used. As the negative electrode current collector and the positive electrode current collector, a stainless steel foil, an aluminum foil, and the like, are preferably used because they are inexpensive.

The above-mentioned all-solid-state lithium-sulfur battery may include a separator or the like, in addition to the above-mentioned positive electrode material, positive electrode current collector, solid electrolyte, negative electrode material, and negative electrode current collector. The shape of the all-solid-state lithium-sulfur battery is not particularly limited, and includes, for example, a coin type, a button type, a sheet type, a stacked type, a cylindrical type, a flat type, a square type, and the like.

In the all-solid-state lithium-sulfur battery of the present invention, since the positive electrode material contains an ionic liquid or a solvated ionic liquid, and the ionic liquid or the solvated ionic liquid has excellent lithium ion conductivity, the operating temperature is 110° C. or less. Because the operating temperature is 110° C. or less, the ionic liquid or the solvated ionic liquid does not evaporate. The ionic liquid or the solvated ionic liquid is an incombustible electrolytic solution, and also, does not have flammability. Such a low operating temperature facilitates heat retention of a battery when a battery is not used, and improves the charge-discharge efficiency as the final battery system. In a conventional sodium sulfur battery, an operating temperature is high. The higher the operating temperature, the more thermal energy insulation of a battery is required for keeping the battery warm, and the total efficiency is reduced.

Meanwhile, the all-solid-state lithium-sulfur battery of the present invention has very low fire risk and is excellent in safety, and has improved durability, battery safety, and cycle safety.

The application of use of the all-solid-state lithium-sulfur battery of the present invention is not particularly limited. The all-solid-state lithium-sulfur battery can be suitably used for hybrid vehicle, electric vehicle, electric power storage, and the like.

When an electric power is stored using the all-solid-state lithium-sulfur battery of the present invention, an electric power system for supplying electric power from the all-solid-state lithium-sulfur battery to the electric power network is constructed. Alternatively, constructed is electric power system for supplying electric power from electric power network using an electric power source such as thermal power generation, hydroelectric power generation, pumping-up hydraulic power generation, and nuclear power generation, and, in addition, natural energy power generation such as solar power generation and wind power generation to the all-solid-state lithium-sulfur battery.

EXAMPLES

Hereinafter, the present invention is described specifically with reference to Examples, but the present invention is not necessarily limited to the following Examples alone.

Production Example 1

First, 33.9 g of lanthanum hydroxide (purity: 99.9%, manufactured by Shin-Etsu Chemical Co., Ltd) and 14.7 g of zirconium oxide (manufactured by Tosoh Corporation) were weighed, and mixed with each other while pulverizing them with a ball mill for one hour. From the obtained powder body, 0.26 g of the powder body was weighed and taken out, poured into a molding die having a predetermined size, and molded using a uniaxial press machine so as to produce ten plate-shaped molded bodies each having a diameter of 13 mm and a thickness of 1 mm. The ten produced plate-shaped molded bodies were transferred to ceramic firing containers, respectively, and fired in an electric furnace at 1500° C. for 36 hours, followed by naturally cooling to obtain a plate-shaped lanthanum-zirconium oxide molded bodies.

Additionally, 2.8 g of lithium hydroxide (manufactured by KANTO CHEMICAL CO., INC.) was dissolved in 30 ml of water to prepare a lithium aqueous solution, and 1.0 ml of the prepared lithium aqueous solution was weighed and taken out, and respectively added into the ceramic firing containers containing the plate-shaped lanthanum-zirconium oxide.

Subsequently, the ceramic firing container was transferred to a microwave firing furnace and irradiated with microwave and fired at a furnace temperature of 400° C. for 36 hours to obtain plate-shaped lithium-lanthanum-zirconium composite oxide molded bodies (LLZ molded body) each having a diameter of 12 mm and a thickness of about 0.5 mm.

Example 1

Using one of the obtained LLZ molded bodies produced in Production Example 1, gold was sputtered to a surface that was defined as a negative electrode side, and then a positive electrode material was formed on a surface opposite side to the negative electrode side. The positive electrode material was formed as follows.

A masking tape was prepared by concentrically cutting the center of a polyimide tape (thickness: 0.09 mm) into a circle with a diameter of 8 mm. The masking tape was attached to a surface at the positive electrode side of the LLZ molded body. The 8-mm diameter circular portion surrounded by the masking tape was made to be a positive electrode forming portion.

Meanwhile, 1.00 g of sulfur was weighed and taken into an agate mortar, and pulverized. Then, 0.50 g of Ketjen black (having a specific surface area of 1270 $m^2/g$, EC-600JD manufactured by Lion Corporation) was weighed and added thereto, mixed with each other for 30 minutes, and dried at 155° C. for six hours to obtain a mixture of sulfur and Ketjen black. From the mixture, 0.180 g of the mixture was weighed and taken into an agate mortar, carried into a glove box, and 0.167 g of KF polymer (an N-methyl-2-pyrrolidone solution containing 12% by mass of polyvinylidene fluoride, manufacture by KUREHA CORPORATION), and 0.030 g of [Li(G4)][FSI] (a solution obtained by dissolving equimolar lithium-bis(fluorosulfonyl)imide (LiFSI) (manufacture by KISHIDA CHEMICAL Co., Ltd.) in tetraglyme (manufacture by KISHIDA CHEMICAL Co., Ltd.)) were added thereto, and mixed with each other while N-methyl-2-pyrrolidone was added little by little using a micropipette to prepare slurry. The total amount of the added N-methyl-2-pyrrolidone was 1.0 ml.

The prepared slurry was taken at the end of the glass rod, applied to the center portion of the positive electrode forming portion of the LLZ molded body, and the slurry was cut by rubbing and leveled by allowing the end face of a slide glass to reciprocate two or three times, such that the slurry was spread through the entire positive electrode forming portion flat and uniformly. Subsequently, the slurry was dried using a vacuum dryer at 80° C. whole day and night to completely remove N-methyl-2-pyrrolidone and a solvent N-methyl-2-pyrrolidone included in the KF polymer, then the masking tape was peeled off. Thus, a positive electrode material was produced on the LLZ molded body. The amount of the positive electrode material calculated from a difference in mass of the LLZ molded body between before and after formation of the positive electrode material was 0.00075 g.

Example 2

The following coin-type battery was assembled using the positive electrode material formed in Example 1.

Using a commercially available coin-type battery cell case, a ring-shaped gasket was fitted into a lower cap, a washer (whose material was stainless steel) was put on the lower cap, and a spacer (whose material was stainless steel, and which had a disk shape having outer diameter of 15 mm and thickness of 0.3 mm) was loaded as a negative electrode current collector, and a lithium foil (having a diameter of 8 mm and thickness of 600 μm) serving as a negative electrode was mounted on the spacer. Then, the LLZ molded body was mounted such that a sputtered layer of gold is overlapped onto the lithium foil, and the lithium foil was brought into close contact with the LLZ molded body by heating at 120° C. A stainless steel foil (having a diameter of 8 mm and a thickness of 20 μm) serving as a positive electrode current collector was mounted on the positive electrode material of the LLZ molded body, and the upper cap was closed to assemble a battery cell.

Figure 1:
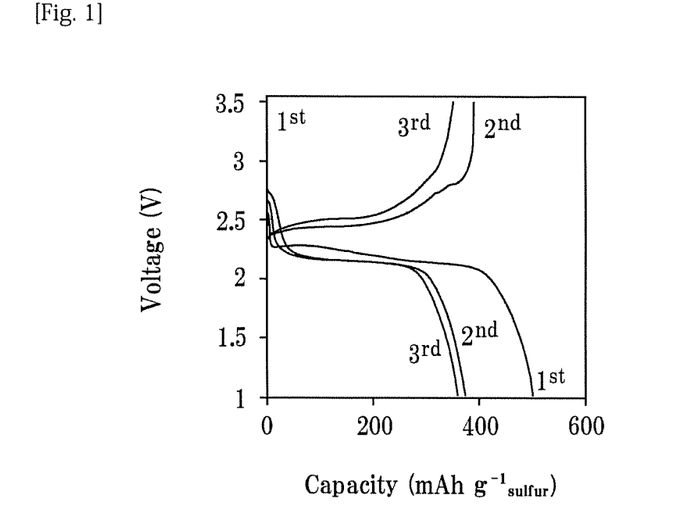
FIG. 1 is a graph showing results of a charge/discharge cycle tests(first to third cycles) of a coin-type battery using a positive electrode material containing an ionic liquid or a solvated ionic liquid of the present invention.
Figure 2:
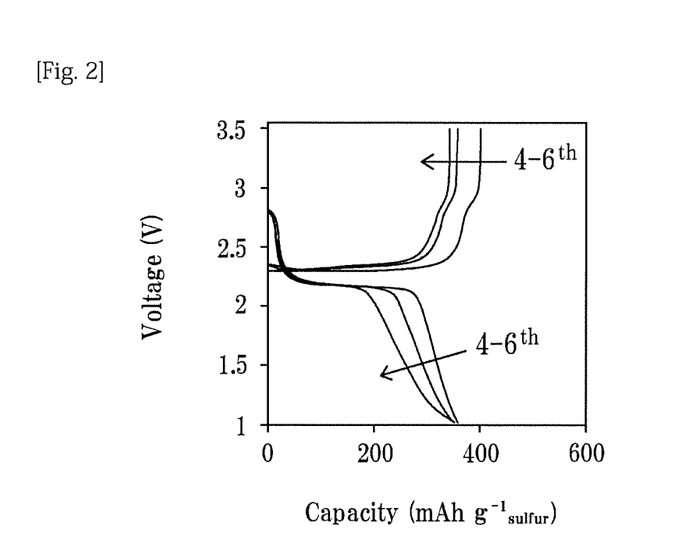
FIG. 2 is a graph showing results of a charge/discharge cycle test (fourth to sixth cycles) of a coin-type battery using a positive electrode material containing an ionic liquid or a solvated ionic liquid of the present invention.

After the battery cell was stored at 100° C. for 12 hours, a charge-discharge test was carried out. As the conditions of the charge-discharge test, a voltage was 1.0 V to 3.5 V The charge-discharge test was carried out six cycles in which at 10 μA (1/30 C) until the third charge-discharge cycle, and at 2 μA (1/150 c) at the fourth charge-discharge cycle or later. Results until the third cycle are shown in FIG. 1 and results of the fourth to sixth cycles are shown in FIG. 2.

Comparative Example 1

A positive electrode material was produced on an LLZ molded body in the same manner as in Example 1 except that [Li(G4)][IFSI] was not used.

Comparative Example 2

A coin-type battery was assembled using the positive electrode material of Comparative Example 1 in the same manner as in Example 2, and the charge-discharge test was carried out. The results are shown in FIG. 3.

Figure 3:
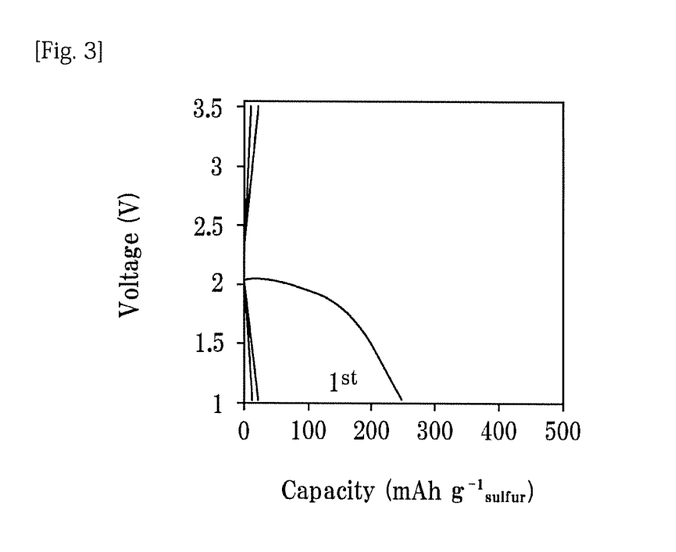
FIG. 3 is a graph showing results of a charge/discharge cycle test of a coin-type battery that using a positive electrode material of Comparative Examples, which do not include an ionic liquid or a solvated ionic liquid.

FIG. 3 shows that a coin-type battery using a positive electrode material of Comparative Example in which [Li(G4)][FSI] is not added shows initial discharge capacity of about 250 mAh/g, but a voltage at the initial discharging time is not constant, and flat discharge curve is not shown. It can be said that it does not show a stable discharge state.

On the other hand, it is shown that a coin-type battery using the positive electrode material of the present invention has charge-discharge capacity of about 400 mAh/g, and has larger capacity than that of the coin-type battery of the Comparative Example in which [Li(G4)][FSI] is not added in the positive electrode material.

Then, as shown in FIGS. 1 and 2, the coin-type battery using the positive electrode material of the present invention shows charge-discharge capacity of about substantially 400 mAh/g until the sixth cycle, and a charge-discharge plateau region showing a stable charge-discharge stale in which a voltage is not changed in any of the charge/discharge cycles, exhibiting excellent charge/discharge cycle characteristics.

It can be said that this increase in discharge capacity and stability of the discharge electric potential are effect of the solvated ionic liquid.

INDUSTRIAL APPLICABILITY

The present invention can suppress deterioration of battery performance due to repeated charge and discharge, and therefore, can provide a lithium-sulfur solid-state battery that is excellent in safely and cycle characteristics, and high energy density.

The invention claimed is:

1. A solid-state lithium-sulfur battery positive electrode material comprising
   sulfur, a conductive material,
   a binder, and
   an ionic liquid or a solvated ionic liquid,
   wherein a percentage of each component in the positive electrode material is 45 to 60% by mass, 20 to 35% by mass, 0.1 to 10% by mass, and 10 to 20% by mass for the sulfur, the conductive material, the binder, and the ionic liquid or the solvated ionic liquid, respectively.

2. The solid-state lithium-sulfur battery positive electrode material according to claim 1, wherein the ionic liquid contains a lithium salt.

3. The solid-state lithium-sulfur battery positive electrode material according to claim 1, wherein the solvated ionic liquid comprises a lithium salt and glyme.

4. The solid-state lithium-sulfur battery positive electrode material according to claim 3, wherein the lithium salt is at least one selected from lithium-bis(fluorosulfonyl)imide and lithium-bis(trifluoromethane sulfonyl)imide, and the glyme is at least one selected from triglyme and tetraglyme.

5. The solid-state lithium-sulfur battery positive electrode material according to claim 1, wherein the conductive material is conductive carbon black.

6. The solid-state lithium-sulfur battery positive electrode material according to claim 1, wherein the binder is polyvinylidene fluoride.

* * * * *